United States Patent
Selbertinger et al.

(10) Patent No.: US 7,345,131 B2
(45) Date of Patent: Mar. 18, 2008

(54) CROSSLINKABLE SILOXANE-UREA COPOLYMERS

(75) Inventors: Ernst Selbertinger, Nünchritz (DE); Wolfgang Ziche, Diera (DE)

(73) Assignee: Wacker Chemie AG, Munich (DE)

( * ) Notice: Subject to any disclaimer, the term of this patent is extended or adjusted under 35 U.S.C. 154(b) by 274 days.

(21) Appl. No.: 10/886,184

(22) Filed: Jul. 7, 2004

(65) Prior Publication Data

US 2005/0009985 A1    Jan. 13, 2005

(30) Foreign Application Priority Data

Jul. 10, 2003  (DE) ................... 103 31 287

(51) Int. Cl.
*C08G 77/26* (2006.01)
(52) U.S. Cl. .................. 528/34; 528/38; 525/474
(58) Field of Classification Search ........... 528/38, 528/34; 525/474
See application file for complete search history.

(56) References Cited

U.S. PATENT DOCUMENTS 5,948,852 A *  9/1999  Wendt et al. ............... 524/731
6,534,615 B2    3/2003  Schäfer et al.
6,750,309 B1    6/2004  Chu et al.
2004/0087752 A1  5/2004  Schindler et al.

FOREIGN PATENT DOCUMENTS

| DE | 101 13 980 A1 | 10/2002 |
| EP | 0 250 248 | 11/1997 |
| EP | 1 201 699 A1 | 5/2002 |
| WO | WO 96/34030 | 10/1996 |
| WO | WO 02/077072 A1 | 10/2002 |
| WO | WO 03/018704 A1 | 3/2003 |

OTHER PUBLICATIONS

Odian "Principles of Polymerization" 2nd Ed., Wiley-Interscience, 1981, p. 133.*
I. Yilgör, POLYMER, 1984, vol. 25, December, p. 1800 f.
English Derwent Abstract AN 2003-312878 [30] Corresp. to WO 03/018704 A1.

* cited by examiner

*Primary Examiner*—Kuo-Liang Peng
(74) *Attorney, Agent, or Firm*—Brooks Kushman P.C.

(57) ABSTRACT

The invention relates to moisture-crosslinkable organopolysiloxane-polyurea block copolymers, to a process for preparing the crosslinkable organopolysiloxane-polyurea block copolymers, and to their use; to crosslinkable compositions comprising the crosslinkable organopolysiloxane-polyurea block copolymers, to the preparation of the crosslinkable compositions, to their vulcanization, and to the use of the vulcanizates.

19 Claims, No Drawings

CROSSLINKABLE SILOXANE-UREA COPOLYMERS

BACKGROUND OF THE INVENTION

1. Field of the Invention

The invention relates to moisture-crosslinkable organopolysiloxane-polyurea block copolymers, to a process for preparing the crosslinkable organopolysiloxane-polyurea block copolymers, and to their use; to crosslinkable compositions comprising the crosslinkable organopolysiloxane-polyurea block copolymers, to the preparation of the crosslinkable compositions, to their vulcanization, and to the use of the vulcanizates.

2. Background Art

Organopolysiloxane-polyurea block copolymers are known and are prepared by copolymerizing aminoalkyl-terminated siloxanes and diisocyanates POLYMER, Vol. 25 (1984), p. 1800 f.).

As a result of the formation of hydrogen bonds between the urea groups, these copolymers can be thermoplastic elastomers. Consequently such copolymers are plastic above the softening point while having elastic properties below it. They can therefore be used, for example, as hot-melt adhesives. A disadvantage for the use of such copolymers as hot-melt adhesives, however, is that the adhesive bonding is reversible as a result of an increase in temperature above the softening point. Moreover, moldings or bonds produced from such copolymers are subject to cold flow, since even below the softening point it is possible for hydrogen bonds to undergo continual scission and reformation, with the possible consequences of deformation and hence failure of the desired adhesive function. The field of use is therefore limited to applications in which no high temperatures and/or forces act on the thermoplastic elastomer.

One solution to the problem is to crosslink the individual polymer chains additionally with covalent bonds; bonds which are not thermally reversible. However, where the thermoplastic elastomers are crosslinked during preparation, for example, by using trifunctional units, it is possible for the processing properties such as melt viscosity to be adversely affected.

Patents EP 0 250 248 B1, EP 0 822 952 A1 and DE 101 13 980 A1 describe organopolysiloxane-polyurea block copolymers provided with moisture-crosslinkable silyl end groups, providing the possibility of crosslinking via these end groups following application in liquid melt form. Particularly in the case of long-chain block copolymers with a low end-group concentration, however, the achievable crosslinking density is low, but on the other hand a high degree of polymerization of the block copolymers is necessary in order for thermoplastic properties to develop.

SUMMARY OF THE INVENTION

It was therefore an object of the present invention to provide organopolysiloxane-polyurea block copolymers which have good thermoplastic processing properties and in which the amount of moisture-crosslinkable groups can be adjusted independently of the polymer chain length. By varying the amount of moisture-crosslinkable groups independently of the polymer chain length, the mechanical strength of the vulcanizates produced from such copolymers can be adjusted to a desired value, since the mechanical strength derives from the density of the additional crosslinking sites. A further object is that of improved adhesion to silicate surfaces. These and other objects are achieved by providing organopolysiloxane-polyurea block copolymers having hydrolyzable groups along the polymer chain.

DETAILED DESCRIPTION OF THE PREFERRED EMBODIMENT(S)

The invention accordingly provides copolymers of the general formula (I):

$$(A)_a(B)_b(C)_c \qquad (I)$$

in which (A) is the general formula (II):

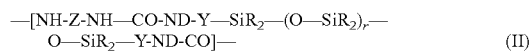

$$\text{—[NH-Z-NH—CO-ND-Y—SiR}_2\text{—(O—SiR}_2)_r\text{—}$$
$$\text{O—SiR}_2\text{—Y-ND-CO]—} \qquad (II)$$

(B) is the general formula (III):

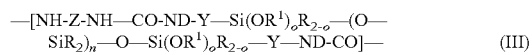

$$\text{—[NH-Z-NH—CO-ND-Y—Si(OR}^1)_o R_{2\text{-}o}\text{—(O—}$$
$$\text{SiR}_2)_n\text{—O—Si(OR}^1)_o R_{2\text{-}o}\text{—Y—ND-CO]—} \qquad (III)$$

(C) is the general formula (IV):

$$\text{—[NH-Z-NH—CO-E-X-E-CO]—} \qquad (IV)$$

where

X is an alkylene radical having 1 to 700 carbon atoms which is optionally substituted by fluorine, chlorine, $C_1$-$C_6$-alkyl or $C_1$-$C_6$ ester and in which nonadjacent methylene units are optionally replaced by —O—, —COO—, —OCO—, or —OCOO—, or is a $C_{6-22}$ arylene radical having 6 to 22 carbon atoms, Y is a $C_{1-30}$ alkylene radical in which nonadjacent methylene units are optionally replaced by groups —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical, or a radical $R_2Si$—X—$NH_2$, E is an oxygen atom or an amino group —$NR^2$—, R is a monovalent $C_{1-20}$ hydrocarbon radical optionally substituted by fluorine or chlorine, $R^1$ is a hydrolyzable group selected from the group consisting of hydrogen, monovalent hydrocarbon radicals having 1 to 20 carbon atoms and optionally substituted by fluorine or chlorine, —(C=O)—R and —N=$CRR^3$, $R^2$ is hydrogen, a $C_{1-10}$ alkyl radical or a $C_{6-22}$ aryl radical, $R^3$ is a monovalent $C_{1-20}$ hydrocarbon radical optionally substituted by fluorine or chlorine, n is an integer from 1 to 4000, r is an integer from 1 to 4000, o is 1 or 2, a is 0, or a natural number greater than zero, b is greater than 0, and c is 0, or a natural number greater than zero, with the proviso that the individual blocks (A), (B), and (C) can be randomly distributed.

Preferably, c=0 and a>5*b, more preferably c=0 and a>10*b.

Z is preferably a saturated alkylene group having up to 24 carbon atoms.

Y is preferably a saturated alkylene group having 1 to 3 carbon atoms, more preferably having 3 carbon atoms.

R is preferably an alkyl group, more preferably a methyl group.

D is preferably an alkyl group or a hydrogen atom, more preferably a hydrogen atom.

X is preferably a polyether group, more preferably a polyoxypropylene group.

E is preferably oxygen.

The group $OR^1$ is preferably an alkoxy group, more preferably a methoxy or ethoxy group. The indices r and n independently of one another are preferably an integer greater than 0, more preferably greater than 30. The index o is preferably the number 2.

Copolymers of the invention comprising component (C) result in a harder material in comparison to copolymers of the invention which contain no component (C), since they contain a greater number of hydrogen bonds. If the fraction of component (C) exceeds a critical level, the transparency of the copolymers of the invention is reduced and the copolymers become cloudy. Preferred polymers are those where c is zero, since then exclusively siloxane chains are present and consequently the polymers have advantages, such as high transparency and UV stability in combination with low surface energies, for example. Predominantly as a result of the appropriate selection of the number of silanol groups in the copolymer of the invention the adhesion to silicate surfaces is improved.

The copolymers of the invention have good mechanical properties independently of the addition of fillers. The copolymers of the invention are further distinguished by outstanding physical properties such as are known principally for polyorganosiloxanes, such as low glass transition temperatures, transparency, resistance to UV light, low surface energies, low hydrophobicity, good dielectric properties, and high permeability to gases, for example. Further advantages of the copolymers of the invention are the high thermal and oxidative stability and good resistance properties with respect to swelling and decomposition by hydrocarbon solvents. Through the use of chain extenders, such as organic diamines or dihydroxy compounds, for example, it is possible to improve polymer properties. Examples of such properties include peel strength and detachment resistance, printability, tensile strength and tear resistance, and water vapor permeability, among others.

The present invention further provides a process for preparing the copolymers of the invention, of the general formula (I), by reacting (1) at least one polymer of the general formula (V)

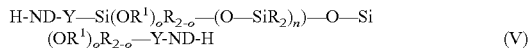
$$H\text{-}ND\text{-}Y\text{---}Si(OR^1)_oR_{2-o}\text{---}(O\text{---}SiR_2)_n)\text{---}O\text{---}Si$$
$$(OR^1)_oR_{2-o}\text{---}Y\text{-}ND\text{-}H \qquad (V)$$

(2) at least one diisocyanate of the general formula (VI)

$$OCN\text{-}Z\text{-}NCO \qquad (VI)$$

or blocked diisocyanates or polyisocyanates, Z being a divalent radical selected from the group consisting of arylene, alkylene, and alkylarylene radicals, (3) optionally polymers of the general formula (VII)

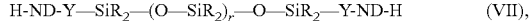
$$H\text{-}ND\text{-}Y\text{---}SiR_2\text{---}(O\text{---}SiR_2)_r\text{---}O\text{---}SiR_2\text{---}Y\text{-}ND\text{-}H \qquad (VII),$$

(4) optionally compounds of the general formula (VIII)

$$H\text{-}E\text{-}X\text{-}E\text{-}H \qquad (VIII),$$

(5) optionally chain extenders selected from the group consisting of diamines, diols, and isocyanato-terminated dihydroxy compounds of the general formula (VI), or mixtures thereof, and (6) optionally a catalyst which promotes the addition of the isocyanate group to the active groups of the polymers of the general formulae V and VII and also of the compound of formula VIII, optionally in at least one solvent, in which X, Y, Z, D, R, $R^1$, $R^2$ $R^3$, and o are as defined above.

The copolymers of the invention may be prepared in solution, preferably at from 0 to 100° C. The preferred neat preparation of the copolymers of the invention without solvent, on the other hand, preferably takes place at temperatures above the softening point of the copolymer of the general formula (I).

The stoichiometry of the reactants for preparing the copolymers of the invention is preferably chosen such that the molar ratio of isocyanate groups to isocyanate-reactive groups is in the range from 0.9:1 to 1.3:1, more preferably from 0.95:1 to 1.05:1, and with particular preference, 1:1. Accordingly, both isocyanate-containing and isocyanate-free copolymers of the general formula (I) are obtainable.

The copolymers of the invention can also be prepared by means of processes which are known to the skilled worker and are used, for example, for the synthesis of (pre)polymers for polyurethanes. The synthesis can take place in solution or, preferably, solventlessly. The processes may be batch processes or, preferably, may be continuous; that is, they may take place, for example, in planetary mixers or in extruders.

The uncrosslinked copolymers of the formula (I) can be prepared and processed by the customary processing methods for moisture-crosslinkable polymers or thermoplastic elastomers: for example, by means of extrusion, injection molding, blow molding, and vacuum thermoforming. Thus the copolymers of the invention can be used, for example, as hot-melt adhesives. They can similarly be processed as a melt, such as in injection molding, for example. Processing as a solution or emulsion or suspension is likewise possible, for purposes such as impregnating surfaces.

Preferred applications of the copolymers of the invention of the general formula (I) are their uses as a constituent in adhesives and sealants, as a base material for thermoplastic elastomers such as cable sheathing, hoses, seals, and keyboard mats, for example, for membranes such as selectively gas-permeable membranes, as additives in polymer blends, or for coating applications, e.g., in antistick coatings, tissue-compatible coatings, flame-retarded coatings, and as biocompatible materials. Further application possibilities are as sealants, additives for polymer processing, antifouling coatings, cosmetics, bodycare products, paint additives, an auxiliary in laundry detergents and in treatment of textiles, for the modification of resins or for bitumen modification.

The use of the copolymers of the invention is possible in numerous applications, such as, for example, in sealants, adhesives, as material for fibers, as plastics additives, e.g., as impact modifiers or flame retardants, as material for defoamer formulations, as a high-performance polymer (thermoplastic, thermoplastic elastomer, elastomer), as packaging material for electronic components, in insulation materials or shielding materials, in cable sheathing, in antifouling materials, as an additive for scouring, cleaning or polishing products, as an additive for bodycare compositions, as a coating material for wood, paper, and board, as a mold release agent, as a biocompatible material in medical applications such as contact lenses, as a coating material for textile fibers or textile fabric, as a coating material for natural substances such as leather and furs, for example, as material for membranes, and as material for photoactive systems: for lithographic techniques, optical data securement or optical data transmission, for example.

Preference extends to the use of the copolymers of the invention as a release coating for adhesive tapes and labels, fiber coating for textiles, extrusion aids for thermoplastic processing, medical devices such as catheters, infusion bags or infusion tubes, hot-melt adhesives, PSA coatings, components for the automobile industry that can be overpainted and oversprayed, an additive for polymer modification such as a plasticizer or impact modifier, a film for laminated safety glass, or a joint sealant for the construction industry. The copolymers of the invention can be employed wherever organopolysiloxane-polyurea block copolymers have been employed to date. The copolymers of the invention of the general formula (I) are especially suitable for use in crosslinkable compositions. Preference is given in this context to compositions which are crosslinkable at room temperature. The present invention further provides crosslinkable compositions comprising a copolymer of the invention of the general formula (I). Particular preference is given to crosslinkable compositions comprising (a) the copolymer of the invention of the general formula (I),
(b) at least one silane-based crosslinker,
(c) an effective amount of at least one catalyst,
(d) at least one reinforcing or nonreinforcing filler or a mixture of reinforcing or nonreinforcing fillers,
(e) if desired, adhesion promoters, and
(f) if desired, further auxiliaries selected from the group consisting of plasticizers, stabilizers, antioxidants, flame retardants, photostabilizers, and pigments.

The crosslinkable compositions of the invention are preferably two-component materials, in which a first component A comprises the constituents (a), optionally (d), and, where used, (f) and a second component B comprises the constituents (b), optionally (c), where used (e), and, where used, (f). For the provision of components A and B it is possible for the respective constituents used to be mixed with one another in any desired manner known to date. This mixing takes place preferably at room temperature or at a temperature which comes about automatically, without provision of heating or cooling, when the constituents are combined at room temperature, and at the pressure of the surrounding atmosphere, in other words about 900 to 1100 hPa. Alternatively, if desired, this mixing can take place at higher or lower pressures. Lower pressures are useful, for example, in order to avoid gas inclusions.

The preparation of the materials of the invention and their storage take place preferably under essentially anhydrous conditions, in order to prevent premature reaction of the materials.

Fillers (d) can be any fillers which have also been employed to date in crosslinkable materials. Examples of fillers are reinforcing fillers, which are fillers having a BET surface area of at least 30 $m^2/g$, such as carbon blacks, fumed silica, precipitated silica, and silicon-aluminum mixed oxides, it being possible for said fillers to have been hydrophobicized, and also nonreinforcing fillers, which are fillers having a BET surface area of less than 30 $m^2/g$, such as powders of quartz, cristobalite, diatomaceous earth, calcium silicate, zirconium silicate, montmorillonites, such as bentonites, zeolites, including the molecular sieves, such as sodium aluminum silicate, metal oxides, such as aluminum oxide and zinc oxide and their mixed oxides, metal hydroxides, such as aluminum hydroxide, barium sulfate, calcium carbonate, gypsum, silicon nitride, silicon carbide, boron nitride, glass powder, carbon powder, and polymer powder, and hollow glass and plastic beads.

Filler (d) preferably comprises fumed silicas or carbon blacks or mixtures thereof, particular preference being given to carbon black having a BET surface area of at least 30 $m^2/g$.

If the compositions of the invention comprise fillers (d), the amounts are preferably from 1 to 50 percent by weight, preferably from 2 to 30 percent by weight.

The crosslinkable compositions of the invention can optionally comprise further organopolysiloxanes. In that case the crosslinkable compositions of the invention preferably comprise α,ω-dihydroxypolydimethylsiloxanes. These constituents are preferably used in order to adjust processing properties such as viscosity or pot life, and are preferably α,ω-dihydroxypolydimethylsiloxanes having a viscosity of from 100 to 500,000 mPas. The α,ω-dihydroxypolydimethylsiloxanes are preferably used in amounts of from 1 to 20 parts by weight, more preferably from 2 to 10 parts by weight, based in each case on 100 parts by weight of constituent (a).

Crosslinkers (b) can be any crosslinkers which have been employed to date in condensation-crosslinkable materials. Examples of crosslinkers (b) are organyloxysilanes and their partial hydrolysates, such as tetraethoxysilane, tetra-isopropoxysilane, tetra-n-propoxysilane, methyltrimethoxysilane, methyltriethoxysilane, vinyltrimethoxysilane, and vinyltriethoxysilane, and partial hydrolysates thereof. Preferred crosslinkers (b) are tetraethoxysilane, tetra-isopropoxysilane, and tetra-n-propoxysilane, with tetraethoxysilane and tetra-n-propoxysilane being particularly preferred.

The crosslinkable compositions of the invention contain the crosslinker (b) in amounts of preferably from 0.05 to 10 parts by weight, more preferably from 0.2 to 5 parts by weight, based in each case on 100 parts by weight of constituent (a).

As adhesion promoters (e) it is possible to use all adhesion promoters which have also been employed to date in condensation-crosslinkable materials. Examples of adhesion promoters (e) are silanes having hydrolyzable groups and SiC-bonded vinyl, acryloyloxy, methacryloyloxy, epoxy, acid anhydride, acid, ester or ether groups, and also their partial and mixed hydrolysates. Preference as adhesion promoter (e) is given to using 3-aminopropyltriethoxysilane, 3-(2-aminoethyl)aminopropyltrimethoxysilane, 3-aminopropyltrimethoxysilane, and 3-(2-aminoethyl)aminopropyltriethoxysilane, with 3-aminopropyltriethoxysilane being particularly preferred.

If the materials of the invention comprise adhesion promoters (e) the amounts are preferably from 0.01 to 5 parts by weight, more preferably from 0.5 to 4 parts by weight, based in each case on 100 parts by weight of constituent (a).

As catalysts (c) it is possible to use all of the condensation catalysts known to the skilled worker. Examples of condensation catalysts (c) are butyl titanates and organotin compounds such as di-n-butyltin dilaurate and di-n-butyltin diacetate and the reaction products thereof with the alkoxysilanes referred to above as crosslinkers or adhesion promoters, and dialkyltin oxide solutions in the alkoxysilanes mentioned above as crosslinkers or adhesion promoters, with preference being given to di-n-butyltin dilaurate and dibutyltin oxide in tetraethyl silicate, and particular preference being given to di-n-butyltin dilaurate.

If the crosslinkable compositions of the invention comprise catalyst (c) the amounts are preferably from 0.01 to 3 parts by weight, more preferably from 0.05 to 2 parts by weight, based in each case on 100 parts by weight of constituent (a).

The further substances (f) used if desired are preferably antioxidants and photostabilizers. Other further substances are conventional polymer additives, including biocides, tc.

If constituent (f) is used the amounts are preferably from 0.01 to 5 percent by weight, more preferably from 0.05 to 4 percent by weight.

The individual constituents of the crosslinkable compositions of the invention may in each case comprise one kind of such a constituent or else a mixture of at least two different kinds of such constituents.

For the crosslinking of the compositions of the invention the normal water content of the air is preferably sufficient. Crosslinking of the compositions of the invention preferably takes place at room temperature. If desired it may also be carried out at temperatures higher or lower than room temperature, such as at −5 to 15° C. or at 30 to 50° C., for example, and also by means of water concentrations that exceed the normal water content of the air. Crosslinking is preferably carried out at a pressure of from 100 to 1100 hPa, in particular at the pressure of the surrounding atmosphere.

The crosslinkable compositions of the invention, comprising a copolymer of the invention of the general formula (I), are prepared by methods which are known to the skilled worker, such as by means of extruders, compounders, roll mills or dynamic or static mixers. The compositions of the invention can be prepared batchwise or continuously. They are preferably prepared continuously.

Through the composition of the invention, by means of compounding, properties of the copolymers of the invention of the general formula (I), such as the adhesion to plastics, for example, are additionally improved.

The present invention further provides a process for preparing vulcanizates comprising at least one copolymer of the invention of the general formula (I), which comprises the steps of
(I) mixing
  a) at least one copolymer of the general formula (I),
  b) at least one silane-based crosslinker,
  c) an effective amount of at least one catalyst,
  d) at least one reinforcing or nonreinforcing filler or a mixture of reinforcing or nonreinforcing fillers, and
  e) if desired, further auxiliaries selected from the group consisting of plasticizers, stabilizers, adhesion promoters, antioxidants, flame retardants, photostabilizers, and pigments,
with the addition if desired of one or more solvents,
II) hydrolyzing the hydrolyzable groups —OR$^1$ to form silanol groups, and
(III) condensing the silanol groups formed.

Vulcanizates of the copolymers of the invention are obtainable by hydrolysis and subsequent condensation of the silanol groups formed. The hydrolysis can take place by atmospheric moisture or by steam, waterbaths or water-containing solutions in contact with the copolymer of the invention of the general formula (I) or with products which have been treated with the copolymer of the invention of the general formula (I). Vulcanization is likewise possible by constituents of formulations which comprise the copolymer of the invention. Possible constituents are salt hydrates or substances which react with one another and in so doing give off water. Instead of the pure polymer it is also possible to use formulations comprising the copolymer of the invention for preparing vulcanizates.

In comparison to noncrosslinked thermoplastic siloxane-urea copolymers of the prior art, the vulcanizates of the copolymers of the invention have higher hardnesses and a greater 100% stress value. The additional siloxane crosslinking takes place on silyl groups within the polymer chain, which in contrast to comparable block copolymers with terminal, crosslinkable silyl groups, in accordance with the prior art, produces a substantially higher breaking elongation in the vulcanizates.

As a result of the crosslinking the vulcanizates of the copolymers of the invention are no longer plastic, and so can no longer flow and are therefore dimensionally stable. All in all, then, the vulcanizates of the invention have better mechanical properties, and so can be employed in more diverse fields of use.

The vulcanizates of the invention are preferably used as adhesives, including as a hot-melt adhesive or as a PSA (pressure sensitve adhesive), sealant, coating for paper, textile, fibers or silicatic surfaces, for example, impregnant, paint, constituent in composites, additive for polymers, molding and component for medical purposes, and also for use in automobile construction or laminated glass.

All of the above symbols in the above formulae have their definitions in each case independently of one another.

The examples which follow describe preferred embodiments of the present invention, without restricting its scope. The mechanical properties are determined in accordance with DIN 53504 and 53505. The aminopropyl-terminated polydimethylsiloxanes are prepared according to EP 1 201 699.

EXAMPLE 1

Monomer Preparation (Not Inventive)

To prepare the aminopropyldimethoxysilyl-terminated polydimethylsiloxane 500 parts by weight (pbw) of a polydimethylsiloxane terminated with silanol groups and having a viscosity of 50 mPas are mixed with 150 pbw of aminopropyltrimethoxysilane and after 12 hours the mixture is freed from volatiles by short-path distillation.

EXAMPLE 2

20 pbw of an aminopropyl-terminated polydimethylsiloxane having a molar weight of 2890 g/mol and a viscosity of 50 mPas and 10 pbw of the aminopropyldimethoxysilyl-terminated polydimethylsiloxane from Example 1, having a molar weight of 2950 g/mol and a viscosity of 60 mPas, are dissolved in 40 pbw of tetrahydrofuran (THF) and in the absence of moisture 3 pbw of hexamethylene diisocyanate in 10 pbw of THF are slowly added dropwise. The temperature rises to 32° C. and the mixture is subsequently heated at 50° C. for 2 hours. The solution is poured into a PTFE mold with a depth of about 2 mm and the solvent is evaporated in the absence of moisture. A sheet 1 mm thick is obtained, from which test specimens are punched. Mechanical data for S2 rods are given in Table 1. The sheet is additionally stored for 1 day at 23° C./50% relative humidity (RH), then stored for 1 day in water, and subsequently mechanical data are determined again.

EXAMPLE 3

80 pbw of the solution prepared in Example 2 have 0.3 pbw of a tin condensation catalyst (solution of dibutyltin oxide in tetraethyl silicate, approximately 14% by weight tin) mixed into them before the sheets are cast as in Example 2. The mechanical data before and after 1 day of storage at 23° C./50% relative humidity are set out in Table 1.

EXAMPLE 4

In zone 1 of a contrarotating 25 mm twin-screw extruder (from Collin) having a length/diameter ratio of 25:1, 0.77 pbw of isophorone diisocyanate is introduced. Introduced into zone 2 of the contrarotating 25 mm twin-screw extruder is a mixture of 9 pbw of an aminopropyl-terminated polydimethylsiloxane (molar weight of 2890 g/mol, viscosity of 50 mPas) and 1 pbw of the aminopropyldimethoxysilyl-terminated polydimethylsiloxane from Example 1 (molar weight 2950 g/mol, viscosity 60 mPas) and these components are reacted in the extruder to form a thermoplastic elastomer. The strand conveyed out of the extruder is cooled in air and subsequently granulated. The temperatures of the extruder heating zones are as follows: zone 1; 25° C., zone 2; 90° C., zone 3; 175° C., zone 4; 175° C., zone 5; 140° C., and zone 6; (die) 100° C.

EXAMPLE 5 (NOT INVENTIVE)

30 parts by weight (pbw) of an aminopropyl-terminated polydimethylsiloxane having a molar weight of 2890 g/mol and a viscosity of 50 mPas are dissolved in 40 pbw of tetrahydrofuran (THF) and in the absence of moisture 3 pbw of isophorone diisocyanate in 10 pbw of THF are slowly added dropwise. The temperature rises to 30° C. and the mixture is heated at 50° C. for 2 hours more. The sheets are obtained as described in Example 2. The example shows that without crosslinkable groups no further crosslinking is obtained.

EXAMPLE 6 (NOT INVENTIVE)

30 parts by weight (pbw) of an aminopropyl-terminated polydimethylsiloxane having a molar weight of 2890 g/mol and a viscosity of 50 mPas are dissolved in 40 pbw of tetrahydrofuran (THF) and in the absence of moisture 2.9 pbw of hexamethylene diisocyanate and 0.1 pbw of isocyanatopropyltrimethoxysilane in 10 pbw of THF are slowly added dropwise. The temperature rises to 35° C. and the mixture is heated at 50° C. for 2 hours more. The sheets are obtained as described in Example 2. The example shows that no initial strength is obtained and that with the small amount of terminal crosslinkable groups only a low level of further crosslinking is obtained.

TABLE 1

| Example | Storage conditions | Mechanical data | | | Stress value 100% [MPa] |
| | | Hardness [Shore A] | TS [MPa] | BE [%] | |
| --- | --- | --- | --- | --- | --- |
| 2 | 1 d 25° C./0% RH | 35 | 0.56 | 663 | 0.47 |
|   | 1 d 25° C./50% RH | 43 | 1.16 | 716 | 0.82 |
|   | 1 d water |  |  |  |  |
| 3: | 1 d 25° C./50% RH | 54 | 1.95 | 139 | 1.65 |
| 5: | 1 d 25° C./50% RH | 31 | 0.71 | 204 | 0.64 |
|   | 1 d water |  |  |  |  |
| 6: | 1 d 25° C./0% RH | 24 | 0.37 | 15 | 0 |
|   | 1 d 25° C./50% RH | 66 | 0.7 | 270 | 0.62 |
|   | 1 d water |  |  |  |  |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A neat polymer, neat polymer blend, or solution of the neat polymer, comprising a linear copolymer, crosslinkable in the presence of moisture, comprising moieties A, B, and C of the formula (I):

$$(A)_a(B)_b(C)_c \quad \quad (I)$$

in which (A) has the formula (II):

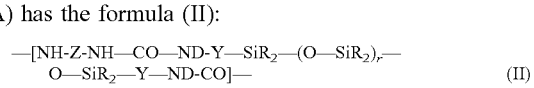

(B) has the formula (III):

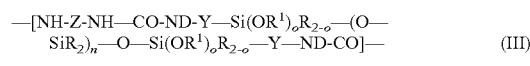

(C) has the formula (IV):

where

X is an alkylene radical having 1 to 700 carbon atoms which is optionally substituted by fluorine, chlorine, $C_1$-$C_6$-alkyl or $C_1$-$C_6$-alkyl ester and in which nonadjacent methylene units are optionally replaced by —O—, —COO—, —OCO—, or —OCOO—, or is a $C_{6-22}$ arylene radical, Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, E is an oxygen atom or an amino group —$NR^2$—, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C=O)—R, and —N=$CRR^3$, $R^2$ is hydrogen, a $C_{1-10}$ alkyl radical, or a $C_{6-22}$ aryl radical, $R^3$ is a monovalent $C_{1-20}$ hydrocarbon radical which is optionally substituted by fluorine or chlorine, n is from 1 to 4000, r is from 1 to 4000, o is 1 or 2, a is at least 0, b is greater than 0, and c is at least 0, with the proviso that the individual blocks (A), (B), and (C) can be randomly distributed, and wherein the copolymer is terminated by end units selected from the group consisting of a residue of a reactant

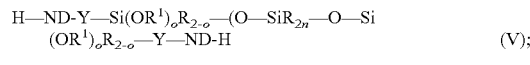

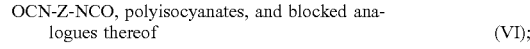

reaction products of a dihydroxy compound with excess diisocyanate;

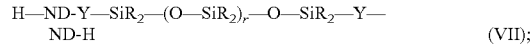

diamines; and mixtures thereof, and an organic solvent when in the form of a solution.

2. The neat polymer, neat polymer blend, or solution of the neat polymer as claimed in claim 1, wherein $OR^1$ in the linear copolymer is an alkoxy group.

3. A process for preparing the linear copolymer of the formula $(A)_a(B)_b(C)_c$ of claim 1, comprising reacting (1) at least one polymer of the formula (V)

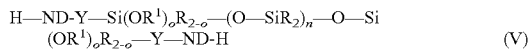

(2) at least one diisocyanate of the formula (VI)

OCN-Z-NCO            (VI)

or blocked diisocyanates or polyisocyanates, Z being a divalent radical selected from the group consisting of arylene, alkylene, and alkylarylene radicals, (3) optionally polymers of the formula (VII)

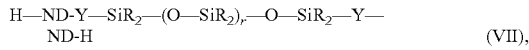

(4) optionally, compounds of the formula (VIII)

H-E-X-E-H            (VIII), (5) optionally one or more diamine, diol, or isocyanato-terminated prepolymers prepared from dihydroxy compounds and isocyanates of the formula (VI), or mixtures thereof as chain extender(s), and (6) optionally a catalyst which promotes the addition of the isocyanate group to the active groups of the polymers of the formulae V and VII and the compound of formula VIII, optionally in one or more solvents, where X is an alkylene radical having 1 to 700 carbon atoms which is optionally substituted by fluorine, chlorine, $C_1$-$C_6$-alkyl or $C_1$-$C_6$-alkyl ester and in which nonadjacent methylene units are optionally replaced by —O—, —COO—, —OCO—, or —OCOO—, or is a $C_{6-22}$ arylene radical, Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, E is an oxygen atom or an amino group, —$NR^2$—, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C=O)—R, and —N=$CRR^3$, $R^2$ is hydrogen, a $C_{1-10}$ alkyl radical, or a $C_{6-22}$ aryl radical, $R^3$ is a monovalent $C_{1-20}$ hydrocarbon radical optionally substituted by fluorine or chlorine, n is from 1 to 4000, r is from 1 to 4000, o is 1 or 2, a is at least 0, b is greater than 0, and c is at least 0 with the proviso that the individual blocks (A), (B), and (C) can be randomly distributed, and wherein the copolymer is terminated by end units selected from the group consisting of a residue of a reactant

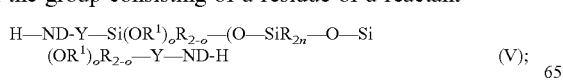

OCN-Z-NCO, polyisocyanates, and blocked analogues thereof            (VI)

reaction products of a dihydroxy compound with excess diisocyanate;

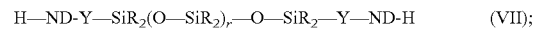

H-E-X-E-H            (VIII);

diamines; and mixtures thereof.

4. In an adhesive or sealant, a base material for thermoplastic elastomers, insulation materials or shielding materials, cable sheathing, hose, seal, sealant, hot-melt adhesive, release coating for adhesive tapes and labels, plastics additive, extrusion aid for thermoplastics processing, packaging material for electronic components, material for fibers, keyboard mats, additive in polymer blends, additive for polymer processing, antifouling coating, additive for scouring, cleaning, polishing or bodycare products, coatings additive, an auxiliary in laundry detergents and textile processing, photoactive system, optical data securement or optical data transfer, medical device, biocompatible material, membrane, gas-permeable membrane, coating, antistick coating, tissue-compatible or flame-retarded coating, defoamer formulation, and resin or for bitumen modifier, the improvement comprising incorporating therein the neat polymer, neat polymer blend, or solution of the neat polymer of claim 1.

5. The neat polymer, neat polymer blend, or solution of the neat polymer as in claim 1, which comprises an essentially anhydrous solution of said neat polymer dissolved in organic solvent.

6. The neat polymer, neat polymer blend, or solution of the neat polymer as in claim 1, wherein the linear copolymer contains terminal —NCO groups.

7. The neat polymer, neat polymer blend, or solution of the neat polymer as in claim 1, wherein the linear copolymer is free of —NCO groups.

8. An essentially anhydrous composition comprising a neat polymer comprising a linear copolymer of claim 1, blended with a further polymer different from said copolymer.

9. An essentially anhydrous neat polymer, neat polymer blend, or solution of the neat polymer, comprising a linear copolymer, crosslinkable in the presence of moisture, comprising moieties A, B, and C of the formula (I):

$(A)_a(B)_b(C)_c$            (I)

in which (A) has the formula (II):

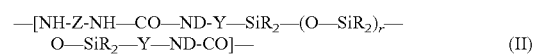

(B) has the formula (III):

(C) has the formula (IV):

—[NH-Z-NH—CO-E-X-E-CO]—            (IV)

where

X is an alkylene radical having 1 to 700 carbon atoms which is optionally substituted by fluorine, chlorine, $C_1$-$C_6$-alkyl or $C_1$-$C_6$-alkyl ester and in which nonadjacent methylene units are optionally replaced by —O—, —COO—, —OCO—, or —OCOO—, or is a $C_{6-22}$ arylene radical, Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, E is an oxygen atom or an amino group —$NR^2$—, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C═O)—R, and —N═$CRR^3$, $R^2$ is hydrogen, a $C_{1-10}$ alkyl radical, or a $C_{6-22}$ aryl radical, $R^3$ is a monovalent $C_{1-20}$ hydrocarbon radical which is optionally substituted by fluorine or chlorine, n is from 1 to 4000, r is from 1 to 4000, o is 1 or 2, a is at least 0, b is greater than 0, and c is at least 0, with the proviso that the individual blocks (A), (B), and (C) can be randomly distributed, and wherein the copolymer is terminated by end units selected from the group consisting of a residue of a reactant

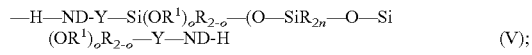
—H—ND-Y—$Si(OR^1)_oR_{2-o}$—(O—$SiR_2$)$_n$—O—Si$(OR^1)_oR_{2-o}$—Y—ND-H    (V);

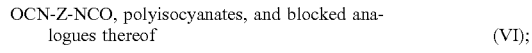
OCN-Z-NCO, polyisocyanates, and blocked analogues thereof    (VI);

reaction products of a dihydroxy compound with excess diisocyanate;

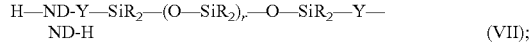
H—ND-Y—$SiR_2$—(O—$SiR_2$)$_r$—O—$SiR_2$—Y—ND-H    (VII);

H-E-X-E-H    (VIII);

diamines; and mixtures thereof, wherein c is zero.

10. An essentially anhydrous neat polymer, neat polymer blend, or solution of the polymer in organic solvent, comprising a composition crosslinkable in the presence of moisture, comprising at least one linear copolymer of the formula (I),

$(A)_a(B)_b(C)_c$    (I)

in which (A) has the formula (II):

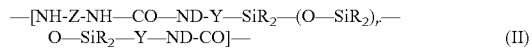
—[NH-Z-NH—CO—ND-Y—$SiR_2$—(O—$SiR_2$)$_r$—O—$SiR_2$—Y—ND-CO]—    (II)

(B) has the formula (III):

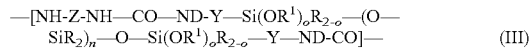
—[NH-Z-NH—CO—ND-Y—$Si(OR^1)_oR_{2-o}$—(O—$SiR_2$)$_n$—O—$Si(OR^1)_oR_{2-o}$—Y—ND-CO]—    (III)

(C) has the formula (IV):

—[NH-Z-NH—CO-E-X-E-CO]—    (IV)

where

X is an alkylene radical having 1 to 700 carbon atoms which is optionally substituted by fluorine, chlorine, $C_1$-$C_6$-alkyl or $C_1$-$C_6$-alkyl ester and in which nonadjacent methylene units are optionally replaced by —O—, —COO—, —OCO—, or —OCOO—, or is a $C_{6-22}$ arylene radical, Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, E is an oxygen atom or an amino group, —$NR^2$—, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C═O)—R, and —N═$CRR^3$, $R^2$ is hydrogen, a $C_{1-10}$ alkyl radical, or $C_{6-22}$ aryl radical, $R^3$ is a monovalent $C_{1-20}$ hydrocarbon radical which is optionally substituted by fluorine or chlorine, n is from 1 to 4000, r is from 1 to 4000, o is 1 or 2, a is greater than 0, b is greater than 0, and c is at least 0, with the proviso that the individual blocks (A), (B), and (C) can be randomly distributed.

11. A vulcanizate of a composition of claim 10.

12. A vulcanizate of claim 11, wherein $OR^1$ is an alkoxy group.

13. An adhesive, hot-melt adhesive, PSA, sealant, coating for paper, textile, fibers or silicatic surfaces, impregnant, paint, constituent in composites, additive for polymers, molding and component for medical purposes, and laminate for glass, comprising a vulcanizate of claim 11.

14. The crosslinkable composition of claim 10, wherein the linear copolymer of the formula I contains terminal groups selected from the group consisting of amino, hydroxyl, isocyanato, blocked isocyanato, and mixtures thereof.

15. The crosslinkable composition of claim 10, wherein $OR^1$ is an alkoxy group.

16. An essentially anhydrous neat polymer, neat polymer blend, or solution of the neat polymer, comprising a composition crosslinkable in the presence of moisture, comprising:

at least one linear copolymer of the formula (I),

$(A)_a(B)_b(C)_c$    (I)

in which (A) has the formula (II):

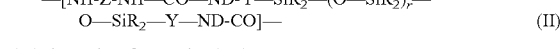
—[NH-Z-NH—CO—ND-Y—$SiR_2$—(O—$SiR_2$)$_r$—O—$SiR_2$—Y—ND-CO]—    (II)

(B) has the formula (III):

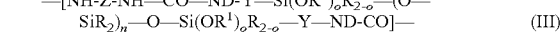
—[NH-Z-NH—CO—ND-Y—$Si(OR^1)_oR_{2-o}$—(O—$SiR_2$)$_n$—O—$Si(OR^1)_oR_{2-o}$—Y—ND-CO]—    (III)

(C) has the formula (IV):

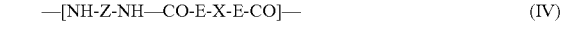
—[NH-Z-NH—CO-E-X-E-CO]—    (IV)

where

X is an alkylene radical having 1 to 700 carbon atoms which is optionally substituted by fluorine, chlorine, $C_1$-$C_6$-alkyl or $C_1$-$C_6$-alkyl ester and in which nonadjacent methylene units are optionally replaced by —O—, —COO—, —OCO—, or —OCOO—, or is a $C_{6-22}$ arylene radical, Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, E is an oxygen atom or an amino group —$NR^2$—, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C=O)—R, and —N=$CRR^3$, $R^2$ is hydrogen, a $C_{1-10}$ alkyl radical, or a $C_{6-22}$ aryl radical, $R^3$ is a monovalent $C_{1-20}$ hydrocarbon radical which is optionally substituted by fluorine or chlorine, n is from 1 to 4000, r is from 1 to 4000, o is 1 or 2, a is greater than 0, b is greater than 0, and with the proviso that the individual blocks (A) (B) can be randomly distributed.

17. A vulcanizate of a composition of claim 16.

18. A vulcanizate of an essentially anhydrous neat polymer, neat polymer blend, or solution of the neat polymer, comprising a composition crosslinkable in the present of moisture, comprising at least one linear copolymer of the formula (I), $$(A)_a(B)_b \quad \text{(I)}$$

in which (A) has the formula (II):

$$-[NH\text{-}Z\text{-}NH\text{—}CO\text{—}ND\text{-}Y\text{—}SiR_2\text{—}(O\text{—}SiR_2)_r\text{—}O\text{—}SiR_2\text{—}Y\text{—}ND\text{-}CO]\text{—} \quad \text{(II)}$$

(B) has the formula (III):

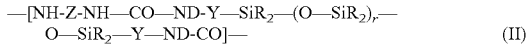

$$-[NH\text{-}Z\text{-}NH\text{—}CO\text{—}ND\text{-}Y\text{—}Si(OR^1)_oR_{2\text{-}o}\text{—}(O\text{—}SiR_2)_n\text{—}O\text{—}O\text{—}Si(OR^1)_oR_{2\text{-}o}\text{—}Y\text{—}ND\text{-}CO]\text{—} \quad \text{(III)}$$

where

Y is a $C_{1-20}$ alkylene radical in which nonadjacent methylene units are optionally replaced by —O—, or is a $C_{6-22}$ arylene radical, Z is a divalent $C_{1-20}$ hydrocarbon radical optionally substituted by fluorine or chlorine, D is hydrogen, a substituted or unsubstituted hydrocarbon radical or a radical $R_2Si$—X—$NH_2$, R is a monovalent $C_{1-20}$ hydrocarbon radical optionally substituted by fluorine or chlorine, $R^1$ together with O is a hydroxyl group or a hydrolyzable group, wherein $R^1$ is selected from the group consisting of hydrogen, monovalent $C_{1-20}$ hydrocarbon radicals optionally substituted by fluorine or chlorine, —(C=O)—R, and —N=$CRR^3$, $R^2$ is hydrogen, a $C_{1-10}$ alkyl radical, or a $C_{6-22}$ aryl radical, $R^3$ is a monovalent $C_{1-20}$ hydrocarbon radical which is optionally substituted by fluorine or chlorine, n is from 1 to 4000, r is from 1 to 4000, o is 1 or 2, a is at least 0, b is greater than 0, and with the proviso that the individual blocks (A) and (B) can be randomly distributed.

19. A process for preparing a vulcanizate of claim 18, comprising the steps of:

(I) mixing (a) at least one linear copolymer of the formula (I), (b) at least one silane-based crosslinker, (c) an effective amount of at least one catalyst, (d) at least one reinforcing or nonreinforcing filler or a mixture of reinforcing or nonreinforcing fillers, (e) optionally, one or more adhesion promoters, and (f) optionally, further auxiliaries selected from the group consisting of plasticizers, stabilizers, antioxidants, flame retardants, photostabilizers, and pigments, optionally with the addition of one or more solvents, (II) hydrolyzing the hydrolyzable groups —$OR^1$ to form silanol groups, and (III) condensing the silanol groups formed.

* * * * *